United States Patent

Veletovac

[11] Patent Number: 5,148,735
[45] Date of Patent: Sep. 22, 1992

[54] ELECTROHYDRAULIC ACTUATOR

[75] Inventor: Sead Veletovac, Winterthur, Switzerland

[73] Assignee: Danfoss A/S, Nordborg, Denmark

[21] Appl. No.: 732,336

[22] Filed: Jul. 17, 1991

Related U.S. Application Data

[63] Continuation of Ser. No. 422,698, Oct. 17, 1989, abandoned.

[30] Foreign Application Priority Data

Oct. 25, 1988 [CH] Switzerland .................... 3972/88

[51] Int. Cl.$^5$ ............................... F15B 13/043
[52] U.S. Cl. ............................ 91/459; 91/461; 137/625.64; 251/129.06
[58] Field of Search ............ 137/625.64; 251/129.06; 91/459, 461

[56] References Cited

U.S. PATENT DOCUMENTS

| | | | |
|---|---|---|---|
| 3,023,782 | 3/1962 | Chaves et al. | 137/85 |
| 3,804,120 | 4/1974 | Garnett | 137/625.64 |
| 3,964,518 | 6/1976 | Hesse et al. | 137/625.64 |
| 4,150,686 | 4/1979 | El Sherif et al. | 137/625.64 X |
| 4,176,822 | 12/1979 | Chadwick | 251/129.06 |
| 4,284,263 | 8/1981 | Newcomb | 251/129.06 |
| 4,298,181 | 11/1981 | Corrado | 251/129.06 |
| 4,538,644 | 9/1985 | Knutson et al. | 137/625.64 |
| 4,617,952 | 10/1986 | Fujiwara et al. | 251/129.06 |
| 4,705,059 | 11/1987 | Lecerf et al. | 251/129.06 X |
| 4,736,773 | 4/1988 | Perry et al. | 137/625.64 |
| 4,825,894 | 5/1989 | Cummins | 251/129.06 X |
| 4,971,106 | 11/1990 | Tsutsui et al. | 251/129.06 X |

FOREIGN PATENT DOCUMENTS

| | | |
|---|---|---|
| 0118344 | 9/1984 | European Pat. Off. |
| 3437150 | 4/1986 | Fed. Rep. of Germany |
| 2425599 | 12/1979 | France |

Primary Examiner—Gerald A. Michalsky
Attorney, Agent, or Firm—Francis C. Hand

[57] ABSTRACT

The actuator has a moving spool in a valve body for controlling the pressure medium inflow to and from an actuating cylinder. The pressure medium in the valve body is conducted to each end of the spool in order to use the pressure medium to move the spool when desired. A pair of piezo-electric or magnetostrictive servomotors are provided to actuate on/off valves, each of which controls a flow of pressure medium from each end of the spool. Upon actuation of a servomotor, a valve is opened so that the pressure at the corresponding end of the spool decreases causing a shift of the spool in that direction. The servomotors are triggered by brief electrical digital signals.

18 Claims, 4 Drawing Sheets

ELECTROHYDRAULIC ACTUATOR

This application is a continuation of application Ser. No. 07/422,698, filed Oct. 17, 1989, now abandoned.

This invention relates to an actuator. More particularly, this invention relates to an electrohydraulic or electropneumatic actuator.

As is known, actuators of the electrohydraulic or electropneumatic type have been constructed in the form of a valve having a valve body and a spool type lid for controlling a flow of pressure medium into and out of an actuating cylinder controlled by the valve. Depending upon the purpose for which the actuator is to be used, the valve may be a servo valve, a diverter valve or a proportional valve.

Generally, actuators of this kind subject the end faces of the spool type lid to the pressure medium and provide a pilot element which varies, in dependence upon an electrical signal, the pressure of the medium acting on the end faces of the spool type lid so that the position of the lid relative to the valve body can be changed. In some cases, the pilot element has been in the form of a baffle plate pivotable between two pressure medium flows issuing from nozzles opposite one another and moving along the spool end faces. In addition, a torque motor is provided to pivot the plate in dependence upon electrical control signals. The pressure variations arising from a pivoting movement of the baffle plate so act on the two end faces of the spool that the spool shifts axially in one or the other direction. However, one disadvantage of this arrangement is that the actuating drive can be triggered only by analog signals and can process only analog signals. Short operating times, a desirable feature, are impossible with analog signals, which also depend upon the system pressure. Another disadvantage is that the pressure medium flows striking the baffle plate lead to continuous leakage losses which must be made up continuously, so that the corresponding energy consumption is correspondingly high. Extensive servicing is also necessary.

Accordingly, it is an object of the invention to be able to operate the spool of an actuator with reduced operating times and reduced leakage losses.

It is another object of the invention to provide an actuator of electrohydraulic or electropneumatic type which is of compact construction.

It is another object of the invention to provide an actuator which can be operated by digital control signals.

Briefly, the invention provides an actuator having a valve body, a spool movably mounted in the valve body for controlling a flow of pressure medium to and from the valve body and duct means for conducting pressure medium to opposite ends of the spool. In accordance with the invention, a pair of on/off valves, each of which is in communication with a respective end of the spool, are provided to control a flow of pressure medium therefrom. In addition, a pair of servomotors is provided each of which is connected with a respective on/off valve for selectively opening the valve in response to an electrical control signal.

The actuator is constructed so that the spool is in an inoperative position when the on/off valves are in the closed position.

The servomotors may be of the piezo-electric or magnetostrictive type. The use of such servomotors and the on/off valves enables the actuator to be triggered by means of digital on/off control signals. The operating times of such an actuator are therefore reduced very considerably with respect to the use of analog control signals. This, in turn, leads to rapid and accurate movements.

The use of the on/off valves drastically reduces pressure medium leakage losses since the pressure medium discharges only for the brief period of time when the valves are opened.

These and other objects and advantages of the invention will become more apparent from the following detailed description taken in conjunction with the accompanying drawings wherein.

Figure 1:
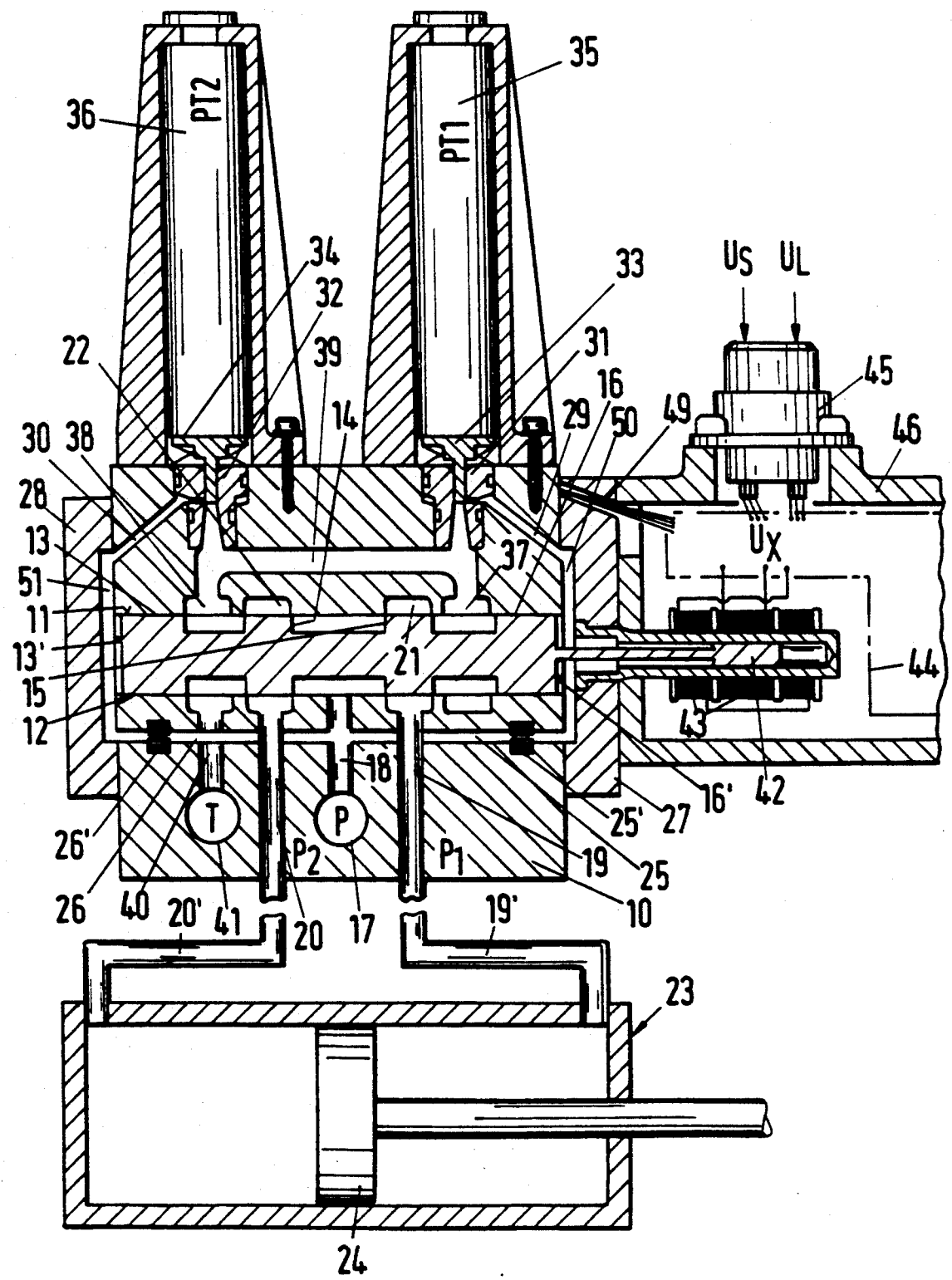
FIG. 1 illustrates a longitudinal sectional view through an electrohydraulic actuator constructed in accordance with the invention.

Referring to FIG. 1, the actuator is constructed as a servo valve having a valve body 10 formed with a longitudinal bore 11 receiving a spool 12 for axial movement. The spool 12 has four piston-like parts 13-16 of the same diameter as the bore 11 and is mounted in the bore 11 by way of the two outer parts 13, 16. When in the position shown in FIG. 1, the spool 12 is in a neutral position.

The valve body 10 has a connection 17 for the supply of a hydraulic pressure medium delivered to the body 10 by a pump (not shown). A duct 18 extends from the connection 17 to the bore 11 between the two parts 14, 15 of the spool 12. In addition, a pair of ducts 19, 20 extend from the bore 11 one on either side of the duct 18 in the body 10, the duct 19 extending into an annular groove 21 around the piston part 15 and the duct 20 extending into an annular groove 22 around the piston part 14. Lines 19', 20' are connected to the exit of the respective ducts 19, 20 from the valve body 10 and extend to opposite ends of a reciprocating motor or actuating cylinder 23 for connection at opposite sides of a piston 24 therein.

A pair of ducts 25, 26 branch off the duct 18 and extend parallel to the bore 11 into a respective chamber 50, 51 at each end of the bore 11. As indicated, covers 27, 28 are releasably secured to the valve body 10 and serve to bound the respective chambers 50, 51. Each duct 25, 26 includes a respective restrictor 25', 26'. The pressure of the hydraulic pressure medium in the connection 17 is therefore operative on the two outer end faces 13', 16' of the spool 12.

A pair of ducts 29, 30 in the body 10 extend from the top zone of the respective chambers 50, 51 to a respective valve seat member 31, 32 received in the body 10. A lid 33, 34 can reciprocate vertically in the respective members 31, 32 to act in both cases as an on/off valve. Servomotors in the form of piezo motors 35, 36 move the respective lids 33, 44 and are flange-connected to the body 10.

The body 10 is formed below each valve seat member 31, 32 as viewed in FIG. 1 with a respective annular groove 37, 38. Consequently, when the spool 12 is in the position illustrated, the groove 37 is disposed between the piston parts 15 and 16 and the groove 38 between the piston parts 13 and 14. The two grooves 37, 38 communicate with one another by way of a duct 39. The groove 38 merges downwardly as viewed in FIG. 1 into a duct 40 terminating at a connection 41 connected to a tank (not shown) in which hydraulic pressure medium collects.

A position indicator cooperates with the spool 12 to generate a signal corresponding to the position of the spool 12. For example, the indicator has a position sensor 42 connected to one end of the spool 12 and induction coils 43 about the sensor 42. The indicator is received in a casing 46 releasably secured in a manner not shown to the cover 27. The casing 46 also receives an electronic control circuit arrangement 44 connected by way of conductors 49 to the two motors 35, 36. A low voltage, represented by an arrow $U_S$, and control signals, represented by an arrow $U_L$, are supplied to the actuator by way of a socket 45 connected to the casing 46. The coils 43 deliver analog actuating signals $U_x$ which are supplied as feedback to the circuit arrangement 44 by way of a signal line 47 and an analog-digital converter 48 visible in FIG. 2.

Figure 2:
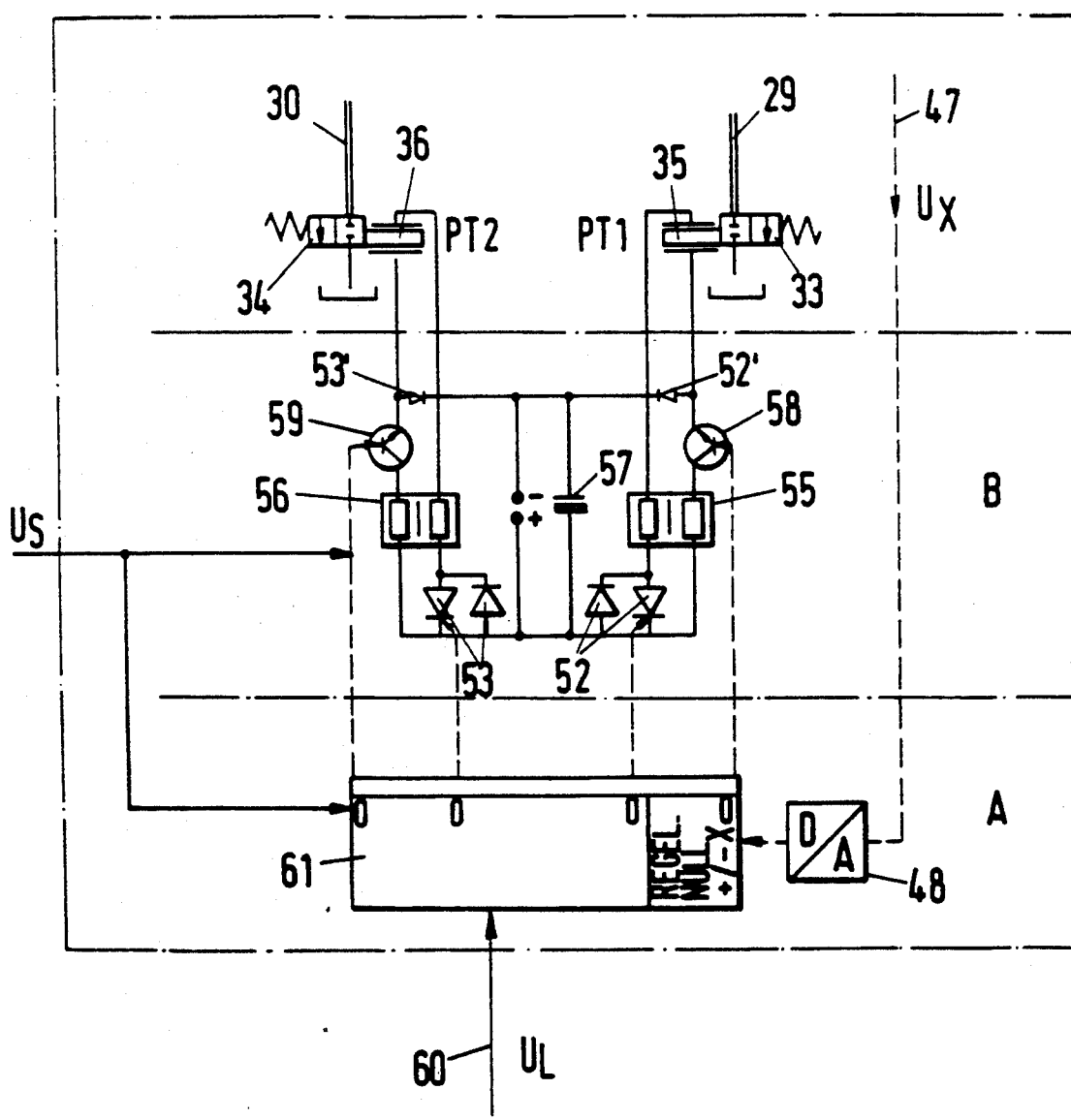
FIG. 2 illustrates a circuit diagram of the electronic part of the actuator of FIG. 1.

Referring to FIG. 2, the electronic control circuit arrangement 44 in the casing 46 mainly comprises a control part A in the form of a microprocessor 61 which receives and processes control signals and an electronic drive or triggering part B which receives the processed signals. The control part A receives, through an input 60, control signals $U_L$ for example, from a memory-programmable control system (SPS). The part A also receives the position signals from the position indicator via the converter 48. The microprocessor 61 converts these signals in accordance with a predetermined selectable set of control parameters and transmits to the drive or triggering part B the control signal supplied through the input 60 as digital pulse signals of variable pulse width or pulse duration modulation.

The signals coming from the part A are amplified in the part B from a low voltage to a voltage required to operate the piezo motors 35, 36. To this end, the part B has a respective choke 55, 56 for each motor 35, 36. A transistor 58, 59 is disposed between each choke and the associated piezo motor end, depending upon its operative position which is controlled by the part A, gates amplified digital signals from the associated choke 55, 56 to the respective motor 35, 36.

The part B comprises a capacitor 57 which together with three transistors 52, 52' and 53, 53' per motor facilitates storage of the energy of the motor.

The actuator shown in FIGS. 1 and 2 operates as follows:

With the spool 12 in the neutral position shown, that space of the bore 11 which is disposed between the piston parts 14, 15 is full of pressure medium, as are the chambers 50, 51 and the ducts 29, 30 since the lids 33, 34 are in the closed position. The ducts 39, 40 are pressureless, whereas the ducts 19, 20, lines 19', 20' and the chambers on either side of the piston 24 are filled with pressure medium. The piston 24 is stationary.

When it is required to move the piston 24 to the right in FIG. 1, corresponding digital signals are supplied from the control part A via the drive part B to the motor 36 which thereupon briefly moves the lid 34 into the open position. Consequently, the pressure in the chamber 51 which acts on the spool end face 13' briefly decreases and pressure medium flows through the duct 30, groove 38 and duct 40 to the connection 41. The higher pressure still acting on the end face 16' moves the spool 12 a small step to the left in FIG. 1 so that the piston part 14 opens the groove 22 and pressure medium flows from the duct 18 through the duct 20 and line 20' into the chamber on the left of the piston 24.

The piston part 15 also opens the groove 21 so that cylinder chamber on the right of the piston 24 depressurizes. As a result, that pressure medium can discharge from the latter chamber through the line 19', duct 19 and groove 21 to the groove 37 and therefrom through the ducts 39, 40 to the tank (not shown) via the connection 41. The amount of movement of the spool 12 and piston 24 depends upon the pulse width of the modulated signal.

The spool 12 returns to the neutral position when the other motor 35 receives a corresponding signal.

Figure 3:
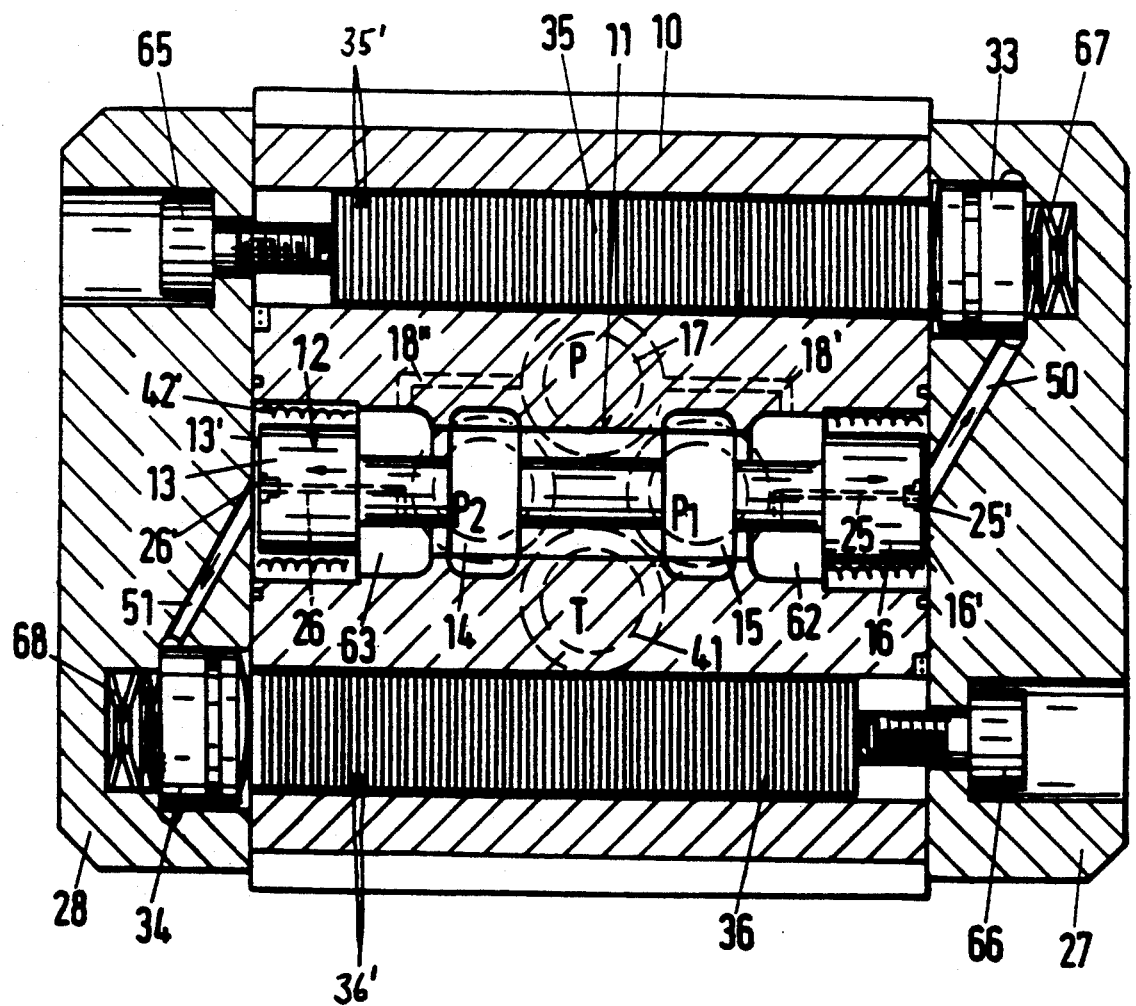
FIG. 3 illustrates a longitudinal sectional view of a modified actuator constructed in accordance with the invention.
Figure 4:
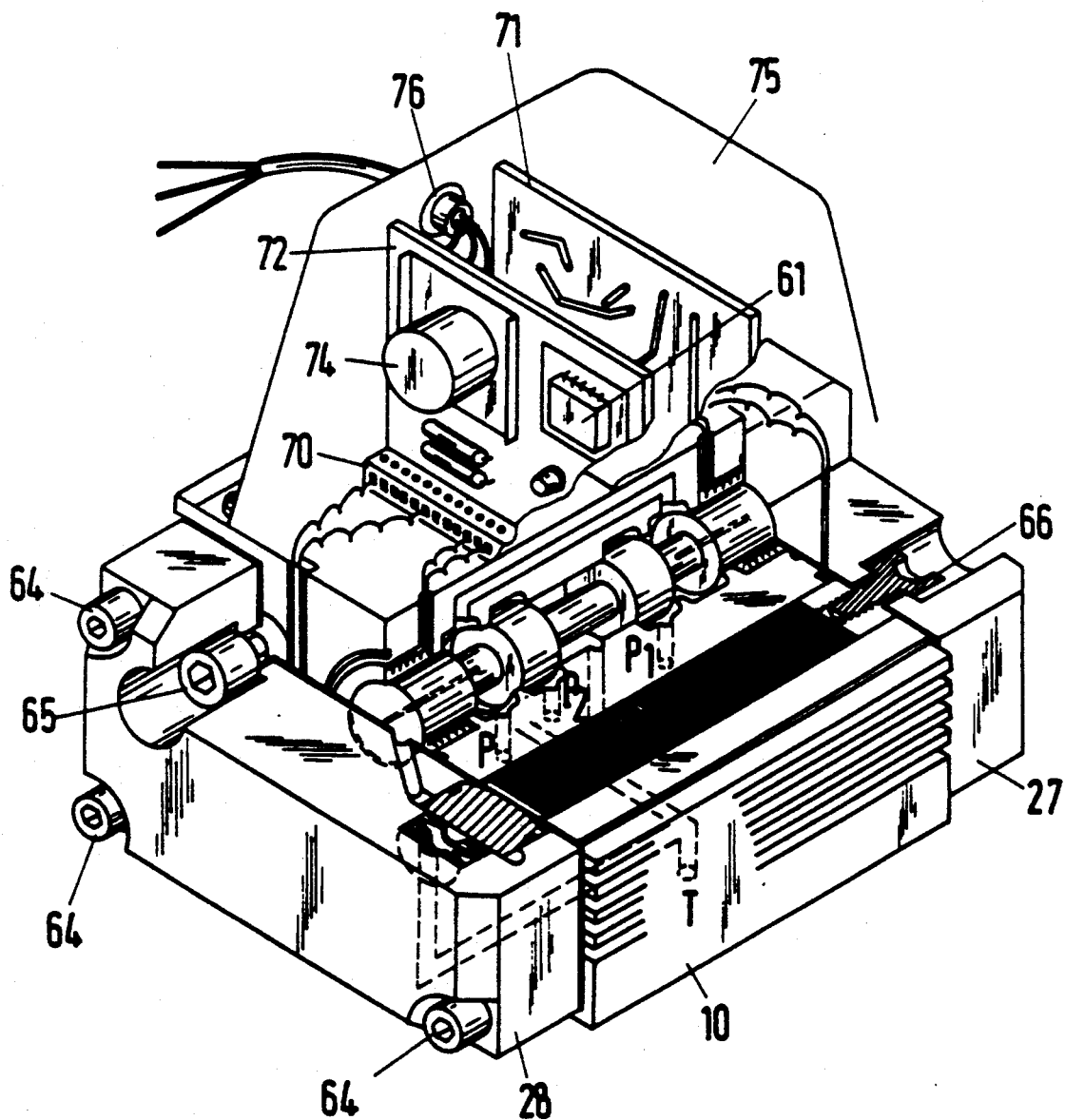
FIG. 4 illustrates a perspective view of the actuator of FIG. 3.

Referring to FIGS. 3 and 4, wherein like reference characters indicate like parts as above, the actuator can be made with a relatively compact construction where each of the servomotors 35, 36 is disposed in the valve body 10 parallel to the spool 12 and on opposite sides thereof. As indicated, the on/off valve 33 associated with the motor 35 is received in the cover 27 coaxially of the motor 35 while the on/off valve 34 associated with the motor 36 is disposed in the opposite cover 28. The two on/off valves are therefore disposed diagonally to one another.

In contrast to the servo valve of FIG. 1, in the valve shown in FIG. 3, the connection 17 for pressure medium from the pump extends by way of two ducts 18', 18" to a respective annular groove 62, 63 contrived in the bore 11, the groove 62 being disposed between the parts 15 and 16 and the groove 63 the parts 13 and 14. However, in a manner not further shown, the outlet 41 is connected to the bore 11 between the parts 14 and 15, so that the ducts 25, 26 together with the respective restrictors 25', 26' can be shifted into the end zones of the spool 12 to further enhance the compactness of the valve.

The ducts 25, 26 start from the respective grooves 62, 63 and terminate at the end face 16', 13' respectively whence a respective duct 51, 50 extends to a respective lid 33, 34. For the sake of clarity, the ducts extending from the latter valves to the outlet 41 are not shown.

The two motors 35, 36 are secured by a respective screw 65, 66 to the respective cover 28, 27 while the associated lids 33, 34 are pressed against the motor in the respective opposite cover 27, 28 in each case by means of a group 67, 68 of cup springs. As can be seen in FIG. 4, the two covers 27, 28 are releasably connected in each case by four screws 64 to the valve body unit 10. Consequently, when these screws 64 are released, the motor 35 together with the cover 27 can be demounted from the body 10. Similar considerations apply to the motor 36 and cover 28.

Each servomotor 35, 36 may be constructed of a stack of piezoelectric discs 35' and 36' respectively in contact with each other wherein each disc is characterized in being able to change thickness when a voltage is imposed on the disc.

In this embodiment, the two outer piston parts 13, 16 of the spool 12 each have an integrated displacement transducer 42' around them which, in this case, is a digital position indicator. Consequently, the converter 48 of FIG. 2 can be omitted.

As can be gathered from FIG. 4, the valve body 10 forms a compact unit with the two covers 27, 28. On the top, the body 10 is combined with a further module unit receiving the electronic circuitry. The further unit comprises a distribution strip 70 and various circuit boards or chips 71, 72 on which the various electronic components such as the microprocessor 61, a power pack 74 and the like are disposed. Extending around the second unit is a hood 75 having on a back wall a lead-through 76 for the electrical wiring and being releasably secured to the valve body 10.

The operation of the servo valve shown in FIGS. 3 and 4 is fundamentally the same as described with reference to FIGS. 1 and 2.

The invention thus provides an actuator of relatively compact construction which can be operated with minimum leakage losses and in relatively brief periods of time.

What is claimed is:

1. In an electrohydraulic actuator, the combination comprising
   a valve body;
   an actuating cylinder operatively connected to said valve body to selectively receive pressure medium on one side from said valve body while delivering pressure medium on an opposite side to said valve body;
   a spool mounted in said valve body for movement from a neutral position thereof to control a flow of pressure medium to and from said cylinder;
   duct means for conducting pressure medium to opposite ends of said spool;
   a pair of on/off valves, each said valve being in communication with a respective end of said spool to control a flow of pressure medium therefrom; and
   a pair of piezoelectric servomotors, each said servomotor including piezoelectric discs, each capable of changing in thickness in response to a voltage imposed thereon, each servomotor being in contact with a respective on/off valve for selectively opening and closing said valve in response to an electrical digital pulse control signal to permit a flow of pressure medium from a respective end of said spool and to effect movement in small steps of said spool from said neutral position in a direction of said respective spool end.

2. An actuator as set forth in claim 1 wherein each servomotor is mounted on said valve body and each on/off valve is mounted in said valve body.

3. An actuator as set forth in claim 1 wherein each servomotor is mounted in said valve body and each on/off valve is mounted on said valve body diagonally opposite each other.

4. An actuator as set forth in claim 1 which further comprises a position indicator for generating a signal corresponding to the position of said spool in said valve body, and an electronic control circuit arrangement connected to said position indicator to receive said position signal and an independently delivered control signal, said control circuit arrangement being connected to each servomotor to selectively actuate a respective servomotor to effect movement of said spool in one of two opposite directions as a function of said position signal and said control signal.

5. An actuator as set forth in claim 4 wherein said servomotors and valves define a first module unit and said control circuit arrangement defines a second module unit for combining with said first module unit.

6. An actuator as set forth in claim 4 wherein said position indicator is a digital position indicator.

7. An actuator as set forth in claim 1 which further comprises a pair of covers secured to opposite ends of said valve body, each said cover having a recess facing a respective end of said spool and communicating with said duct means.

8. An actuator as set forth in claim 1 which further comprises a pair of covers secured to opposite ends of said valve body with said servomotors disposed in said body, each servomotor being secured to a respective cover for removal therewith.

9. An electrohydraulic actuator comprising
   a valve body having a connection to receive a flow of pressure medium and a first pair of ducts for conveying the pressure medium therethrough;
   an actuating cylinder connected at opposite ends to said ducts of said valve body;
   a spool movably mounted in said valve body from a neutral position for controlling a flow of pressure medium from said connection to a selected one of said ducts;
   a second pair of ducts in said valve body, each of said second pair of ducts communicating said connection to a respective end of said spool to expose said spool end to the pressure medium;
   a pair of on/off valves, each valve being in communication with a respective end of said spool to control a flow of pressure medium therefrom; and
   a pair of piezoelectric servomotors, each said servomotor including piezoelectric discs, each capable of changing in thickness in response to a voltage imposed thereon, each servomotor being in contact with a respective on/off valve for selectively opening and closing said valve in response to an electrical digital pulse control signal to permit a flow of pressure medium from a respective end of said spool and to effect movement in small steps of said spool from said neutral position in a direction of said respective spool end.

10. An actuator as set forth in claim 9 which further comprises a position indicator for generating a signal corresponding to the position of said spool in said valve body, and an electronic control circuit arrangement connected to said position indicator to receive said position signal and an independently delivered control signal, said control circuit arrangement being connected to each servomotor to selectively actuate a respective servomotor to effect movement of said spool in one of two opposite directions as a function of said position signal and said control signal.

11. An actuator as set forth in claim 9 which further comprises a pair of covers secured to opposite ends of said valve body, each said cover having a recess facing a respective end of said spool and communication with a respective one of said second pair of ducts.

12. In an electrohydraulic actuator, the combination comprising
   a valve body having a connection to receive a flow of pressure medium and a first pair of ducts for conveying the pressure medium therefrom;
   a spool movably mounted in said valve body from a neutral position for controlling a flow of pressure medium from said connection to a selected one of said ducts;
   a second pair of ducts in said valve body, each of said second pair of ducts communicating said connection to a respective end of said spool to expose said spool end to the pressure medium;
   a pair of on/off valves, each valve being in communication with a respective end of said spool to control a flow of pressure medium therefrom; and a pair of piezoelectric servomotors, each said servomotor including piezoelectric discs, each capable of changing in thickness in response to a voltage imposed thereon, each servomotor being in contact with a respective on/off valve for selectively opening and closing said valve in response to an electrical digital pulse control signal to permit a flow of pressure medium from a respective end of said spool and to effect movement in small steps of said spool from said neutral position in a direction of said respective spool end.

13. The combination as set forth in claim 12 which further comprises a pair of covers secured to opposite ends of said valve body, each said cover having a recess facing a respective end of said spool and communicating with a respective one of said second pair of ducts.

14. An electrohydraulic actuator comprising
   a valve body having a connection to receive a flow of pressure medium and a first pair of ducts for conveying the pressure medium therethrough;
   an actuating cylinder connected at opposite ends to said ducts of said valve body;
   a spool movably mounted in said valve body from a neutral position for controlling a flow of pressure medium from said connection to a selected one of said ducts;
   a second pair of ducts in said valve body, each of said second pair of ducts communicating with said connection to a respective end of said spool to expose said spool end to the pressure medium;
   a pair of on/off valves, each valve being in communication with a respective end of said spool to control a flow of pressure medium therefrom;
   a pair of piezoelectric servomotors, each said servomotor including piezoelectric discs, each capable of changing in thickness in response to a voltage imposed thereon, each servomotor being in contact with a respective on/off valve for selectively opening said valve in response to an electrical control signal to permit a flow of pressure medium from a respective end of said spool and to effect movement in small steps of said spool from said neutral position in a direction of said respective spool end; and
   a pair of covers secured to opposite ends of said valve body with said servomotors disposed in said body, each servomotor being secured to a respective cover for removal therewith.

15. An electrohydraulic actuator comprising
   a valve body having a connection to receive a flow of pressure medium and a first pair of ducts for conveying the pressure medium therefrom;
   a spool movably mounted in said valve body from a neutral position for controlling a flow of pressure medium from said connection to a selected one of said ducts;
   a second pair of ducts in said valve body, each of said second pair of ducts communicating said connection to a respective end of said spool to expose said spool end to the pressure medium;
   a pair of on/off valves, each valve being in communication with a respective end of said spool to control a flow of pressure medium therefrom;
   a pair of piezoelectric servomotors, each said servomotor including piezoelectric discs, each capable of changing in thickness in response to a voltage imposed thereon, each servomotor being in contact with a respective on/off valve for selectively opening said valve in response to an electrical control signal to permit a flow of pressure medium from a respective end of said spool and to effect movement in small steps from said spool from said neutral position in a direction of said respective spool end; and
   a pair of covers secured to opposite ends of said valve body with said servomotors disposed in said body, each servomotor being secured to a respective cover for removal therewith.

16. In an electrohydraulic actuator, the combination comprising
   a valve body;
   an actuating cylinder operatively connected to said valve body to selectively receive pressure medium on one side from said valve body while delivering pressure medium on an opposite side to said valve body;
   a spool mounted in said valve body for movement from a neutral position thereof to control a flow of pressure medium to and from said cylinder;
   duct means for conducting pressure medium to opposite ends of said spool;
   a pair of valves, each said valve being disposed in said duct means in communication with a respective end of said spool to control a flow of pressure medium therefrom;
   a pair of piezoelectric servomotors, each said servomotor including piezoelectric discs capable of changing in thickness in response to a voltage imposed thereon, each servomotor being in contact with a respective valve for selectively moving said valve in response to an electrical digital pulse control signal to control a flow of pressure medium form said duct means; and
   a control circuit arrangement connected to each servomotor to selectively direct a digital pulse signal to a respective servomotor to actuate said respective servomotor independently of the other servomotor.

17. The combination as set forth in claim 16 wherein each valve includes a valve seat member mounted in said duct means in said body and a lid reciprocally mounted in said seat member to control a flow of pressure medium through said valve seat member.

18. In an electrohydraulic actuator, the combination comprising
   a valve body;
   an actuating cylinder operatively connected to said valve body to selectively receive pressure medium on one side from said valve body while delivering pressure medium on an opposite side to said valve body;
   a spool mounted in said valve body for movement from a neutral position thereof to control a flow of pressure medium to and from said cylinder;
   duct means for conducting pressure medium to opposite ends of said spool;
   a pair of on/off valves, each said valve including a valve seat member mounted in said duct means and a lid reciprocally mounted in said seat member for movement between a closed position to close said duct means and an open position to open said duct means, each said valve being in communication with a respective end of said spool to control a flow of pressure medium therefrom in dependence on movement of said lid; and a pair of piezoelectric servomotors, each said servomotor including piezoelectric discs, each disc capable of changing in thickness in response to a voltage imposed therein, each servomotor being in contact with a respective lid of said on/off valves for selectively moving said lid from said closed position thereof in response to an electrical control signal to permit a flow of pressure medium from a respective end of said spool and to effect movement in small steps of said spool from said neutral position in a direction of said respective spool end.

* * * * *

UNITED STATES PATENT AND TRADEMARK OFFICE
CERTIFICATE OF CORRECTION

PATENT NO. : 5,148,735

DATED : September 22, 1992

INVENTOR(S) : SEAD VELETOVAC

It is certified that error appears in the above-identified patent and that said Letters Patent is hereby corrected as shown below:

```
Column 4, Line 4 after "so that" insert -the-
Column 6, Line 51 change "communication" to -communicating-
Column 7, Line 28 cancel "with"
```

Signed and Sealed this

Twenty-sixth Day of October, 1993

*Attest:*

BRUCE LEHMAN

*Attesting Officer*     *Commissioner of Patents and Trademarks*